July 19, 1955   R. G. TILLOU   2,713,483
RUBBER CUSHIONING UNITS FOR SHOCK ABSORBERS
FOR RAILWAY DRAFT RIGGING
Filed Nov. 12, 1953   2 Sheets-Sheet 1
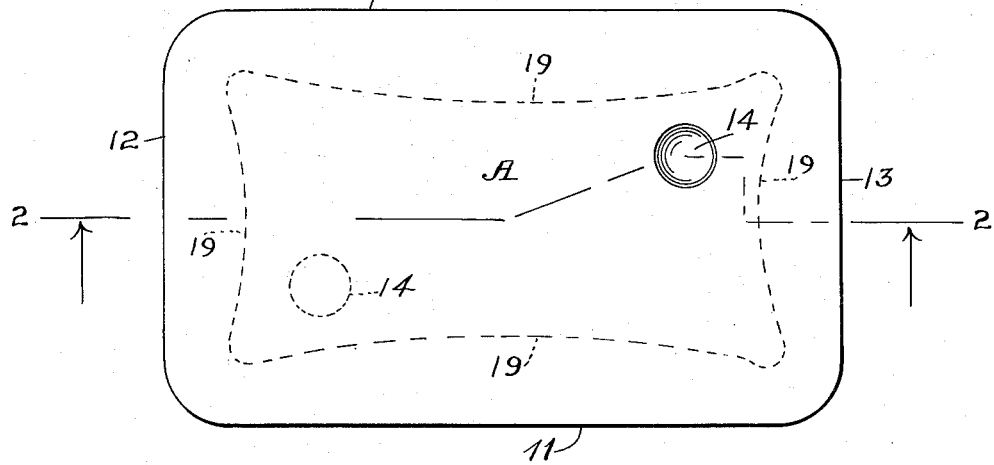
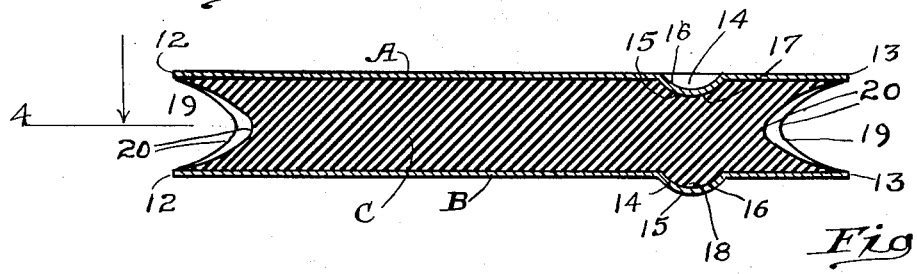
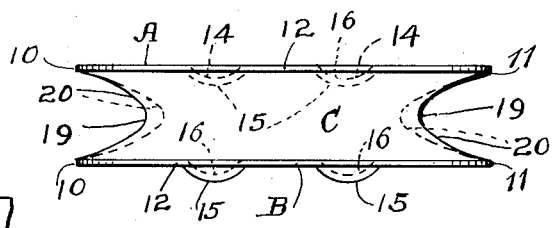
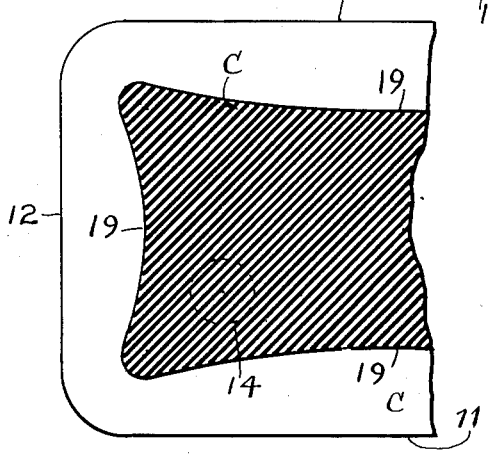
Inventor:
Richard G. Tillou.
By Henry Fuchs
Atty.

July 19, 1955 R. G. TILLOU 2,713,483
RUBBER CUSHIONING UNITS FOR SHOCK ABSORBERS
FOR RAILWAY DRAFT RIGGING
Filed Nov. 12, 1953 2 Sheets-Sheet 2
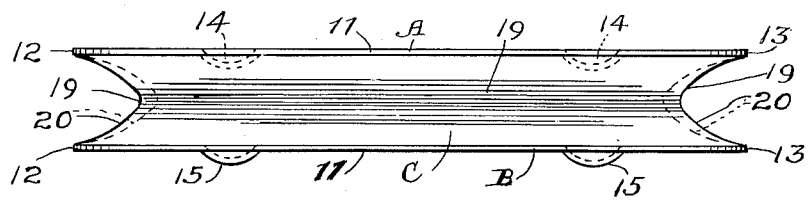
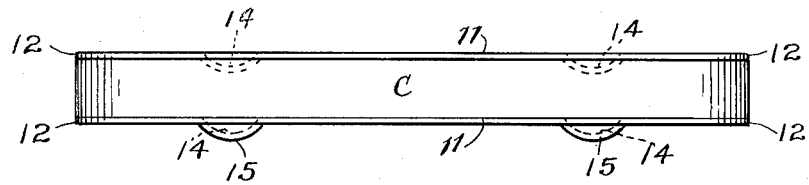
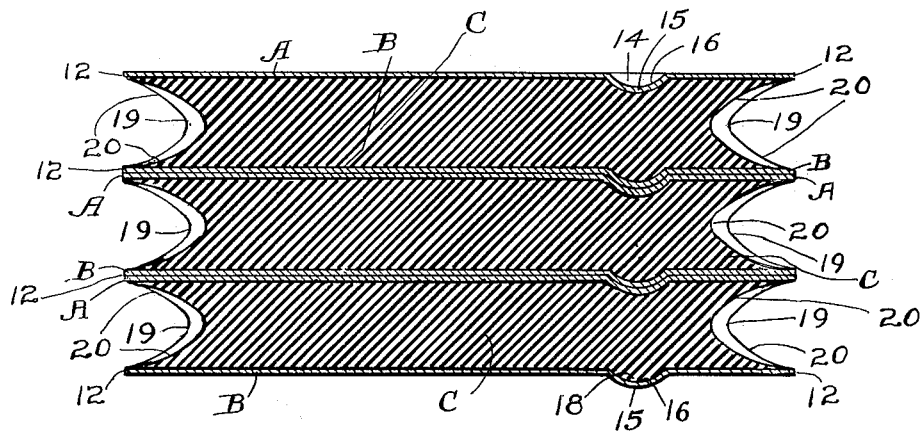
Inventor:
Richard G. Tillou.
By Henry Fuchs
Atty.

United States Patent Office 2,713,483
Patented July 19, 1955

2,713,483

RUBBER CUSHIONING UNITS FOR SHOCK ABSORBERS FOR RAILWAY DRAFT RIGGING

Richard G. Tillou, Berwyn, Ill., assignor to W. H. Miner, Inc., Chicago, Ill., a corporation of Delaware Application November 12, 1953, Serial No. 391,629

5 Claims. (Cl. 267—1)

This invention relates to improvements in rubber cushioning units for shock absorbers for railway draft rigging.

This application is a continuation in part of application, Serial No. 290,606, filed by me May 28, 1952.

One object of the invention is to provide a rubber cushioning unit for shock absorbers for railway draft rigging, comprising a pair of metal plates and a rubber pad interposed between the plates and bonded thereto, wherein the rubber pad corresponds in size to the plates and has the edges thereof shaped concavely or grooved in such a manner that the unit may be compressed to a predetermined extent, without any of the material of the pad being projected outwardly beyond the edges of the plates, where the same would be subjected to possible damage.

Another object of the invention is to provide a rubber cushioning unit as set forth in the preceding paragraph, wherein the edges of the pad are shaped concavely or grooved in such a manner that the material of the pad, in compressed condition, will lie substantially flush with the edges of the plates of said unit.

Yet another object of the invention is to provide a shock absorbing means comprising a yielding column composed of a plurality of cushioning units, each comprising a pair of metal plates and an interposed rubber pad or mat vulcanized and bonded to the plates, wherein adjacent units of the column are provided with interengaged centering projections and seats to align the units of the column.

A further object of the invention is to provide a shock absorbing means comprising a pack of cushioning units, each composed of a substantially flat rubber pad or mat and relatively thin, flat metal plates covering the mat at opposite sides and to which the mat is bonded, wherein the mat and plates of each unit and the abutting plates of adjacent units of the pack are all interlocked by interengaging centering projections and seats provided on said metal plates and rubber mats.

Other objects of the invention will more clearly appear from the description and claims hereinafter following.

In the accompanying drawings forming a part of this specification, Figure 1 is a plan view of my improved cushioning unit.

Figure 2 is a transverse, vertical sectional view, on the line 2—2 of Figure 1.

Figure 3 is a side elevational view, looking from left to right in Figure 1.

Figure 4 is a horizontal sectional view, partly broken away, corresponding substantially to the line 4—4 of Figure 2.

Figure 5 is a front elevational view of Figure 1, looking upwardly in said figure.

Figure 6 is a view similar to Figure 5, showing the cushioning unit compressed.

Figure 7 is a transverse, vertical sectional view, through a complete shock absorber pack composed of a plurality of my improved units.

My improved shock absorbing unit for railway draft rigging, as shown in the drawings, comprises broadly a pair of flat metal plates A and B and an interposed, flat rubber pad or mat C.

The plates A and B are of similar shape and design, each being of substantially rectangular outline, with rounded corners, presenting spaced, parallel, longitudinal edges 10 and 11 and spaced, parellel side edges 12 and 13. Each plate A and B is provided with a pair of indentations or embossments 14—14, which protrude from one side to present centering projections 15—15 and provide seats 16—16 at the other side. As shown in Figures 2, 3, 5 and 7, the seats of the two plates of the unit face upwardly and the projections thereof face downwardly.

The rubber pad or mat C corresponds in outline to the plates A and B, and is interposed between the same to provide the rubber cushioning unit. The pad or mat C has a pair of seats 17—17 at the upper side thereof, as shown in Figures 2, 3, 5, and 7, which receive the centering projections 15—15 of the plate A, and a pair of projecting bosses 18—18 at the lower side, which function as centering projections and are engaged in the seats 16—16 of the plate B. The pad or mat C is vulcanized and bonded to the plates A and B. The peripheral edges of the pad C are shaped concavely or grooved throughout their lengths, as indicated at 19. These concave edges or grooves are of such a depth and transverse cross section that, when the unit is compressed to a predetermined extent required to absorb the desired maximum shocks, the material of the pad or mat throughout the height of the edges thereof will be flush or in vertical alignment with the edges of the plates A and B, as shown in Figure 6. The concave edges or grooves 19 are bowed inwardly between the ends thereof, that is, are of progressively increasing depth from the opposite ends to the mid portions, as most clearly illustrated in Figures 1 and 4. This inwardly bowed construction of the grooves is important in that it prevents piling up of the material of the pad or mat along the mid portions of the edges thereof with resulting protrusion of the mat beyond the edges of the metal plates. The grooves 19 are of outwardly flaring, transverse cross section, having the side walls thereof slightly curved concavely, and the inner or back walls rounded concavely on a relatively short radius, as indicated at 20, and merging with the flaring side walls. As shown in Figures 2, 3, 5, and 7, the material of the pad or mat C in the region adjacent the edges of the plates thins out gradually in direction toward the peripheral edge of said pad, terminating in a mere film at the edge portion of the corresponding plate.

My complete shock absorber, as shown in Figure 7, is in the form of a resilient column and comprises a stack or pack of three of the rubber units illustrated in Figures 1 to 6 inclusive, the same being held in alignment by the centering projections 15—15 of the plates B of said units being seated in the seats 16—16 of the plates A of the adjacent unit.

In absorbing shocks, the units comprised in the shock absorber shown in Figure 7 are subjected to compression, the rubber pad C of each unit being flattened out between the plates A and B until, under maximum compression, it reaches the condition shown in Figure 6, with the material of the pad or mat squeezed out to bring the vertical edges flush with the outer edges of the plates A and B throughout the height of said pad.

I claim:

1. A shock absorbing unit for railway draft rigging, comprising a pair of metal plates having sides and ends and a solid rubber pad interposed between said plates and bonded thereto, said pad corresponding in outline to said plates and having its peripheral edge faces grooved lengthwise, the groove of each edge face of said pad being bowed inwardly between its ends.

2. A shock absorbing unit as specified in claim 1, in which throughout their length the faces of the rubber defining the grooves curve, from lines of maximum depth midway between the plates, outwardly in two directions and coincide with the plates at the edges thereof.

3. A shock absorbing unit as specified in claim 1, in which the metal plates are parallel and the rubber pad in the regions adjacent the edges of the plates is thin and its edge surface curves gradually towards tangency at the edges of the plates.

4. A shock absorbing unit as specified in claim 3, in which the groove in each edge face of the pad throughout its length is symmetrical with respect to a plane midway between the plates and parallel thereto.

5. A shock absorbing unit as specified in claim 4, in which the groove in each edge face of the pad has volume equal to the volume of rubber flowing into it as the unit is compressed to a predetermined extent.

References Cited in the file of this patent

UNITED STATES PATENTS

| | | |
|---|---|---|
| 2,147,518 | Boxan | Feb. 14, 1939 |
| 2,167,911 | Schieferstein | Aug. 1, 1939 |
| 2,486,741 | Gabriel | Nov. 1, 1949 |
| 2,639,141 | Gabriel | May 19, 1953 |
| 2,656,182 | Willison | Oct. 20, 1953 |

FOREIGN PATENTS

| | | |
|---|---|---|
| 375,954 | Great Britain | July 7, 1932 |
| 762,631 | France | Jan. 22, 1934 |